United States Patent [19]

Holmes

[11] Patent Number: 4,516,244
[45] Date of Patent: May 7, 1985

[54] COMMON-PASS DECENTERED ANNULAR RING RESONATOR WITH IMPROVED POLARIZATION CONTROL

[75] Inventor: Dale A. Holmes, Simi Valley, Calif.

[73] Assignee: Rockwell International Corporation, El Segundo, Calif.

[21] Appl. No.: 528,493

[22] Filed: Sep. 1, 1983

[51] Int. Cl.³ .................................................. H01S 3/08
[52] U.S. Cl. ........................................ 372/99; 372/95; 372/93
[58] Field of Search ................... 372/95, 93, 103, 108, 372/99

[56] References Cited

U.S. PATENT DOCUMENTS 3,909,744  9/1975  Wisner et al. ........................ 372/95
4,050,036  9/1977  Chambers et al. .................. 350/299

OTHER PUBLICATIONS

Chodzko et al; "Annular (HSURIA) Resonators: Some Experimental Studies Including Polarization Effects", Appl. Opt., vol. 19, No. 5, Mar. 1, 1980.
Guha et al; "Performance of an Annular Resonator with a Polarizer in the Annular Leg"; Appl. Opt., vol. 20, No. 3, Dec. 1, 1981.

Primary Examiner—William L. Sikes
Assistant Examiner—Léon Scott, Jr.
Attorney, Agent, or Firm—H. Fredrick Hamann; Harry B. Field

[57] ABSTRACT

An improvement of a common-pass, decentered, annular ring resonator (CPDARR) in which the waxicon mirror-reflector component 18 is formed with five reflecting surfaces, two on the central axicon 40, 42 and three on the outer ring axicon 44, 46, 48. The orientation and curvature of the reflecting surfaces is designed to provide three reflections of an input laser beam impinging on the inner reflector 40 of the central axicon and two reflections of an input wave impinging on the outer reflector surface 48 of the ring axicon (or vice versa). The number of reflections in the waxicon 18 combined with the two reflections in the rear ring mirror 20 of the CPDARR allows all reflecting surfaces to be coated with conventional high-reflectance coating and still provide a uniform-polarity output laser beam from the CPDARR.

8 Claims, 10 Drawing Figures

COMPOUND WAXICON                    REAR CONE

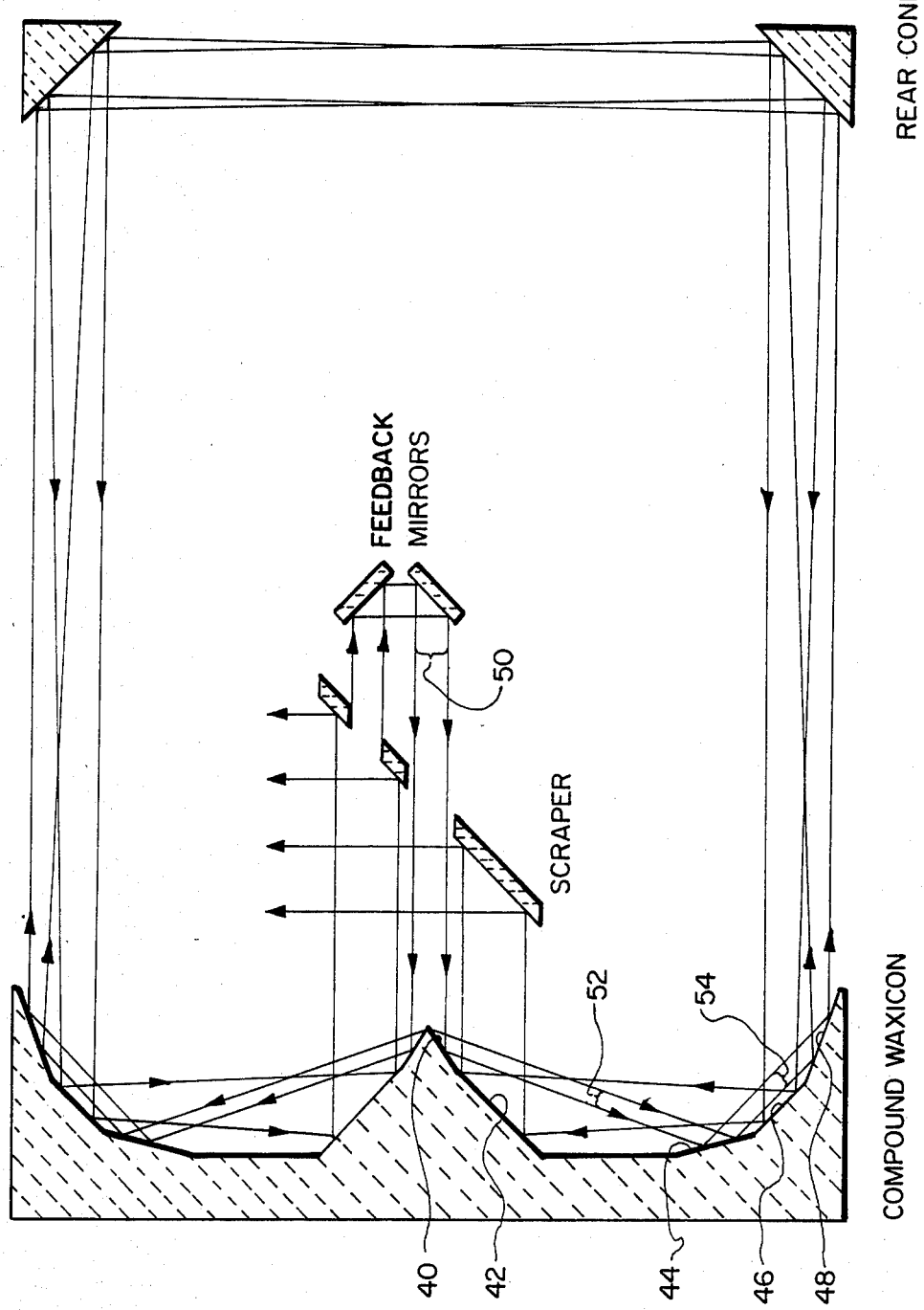

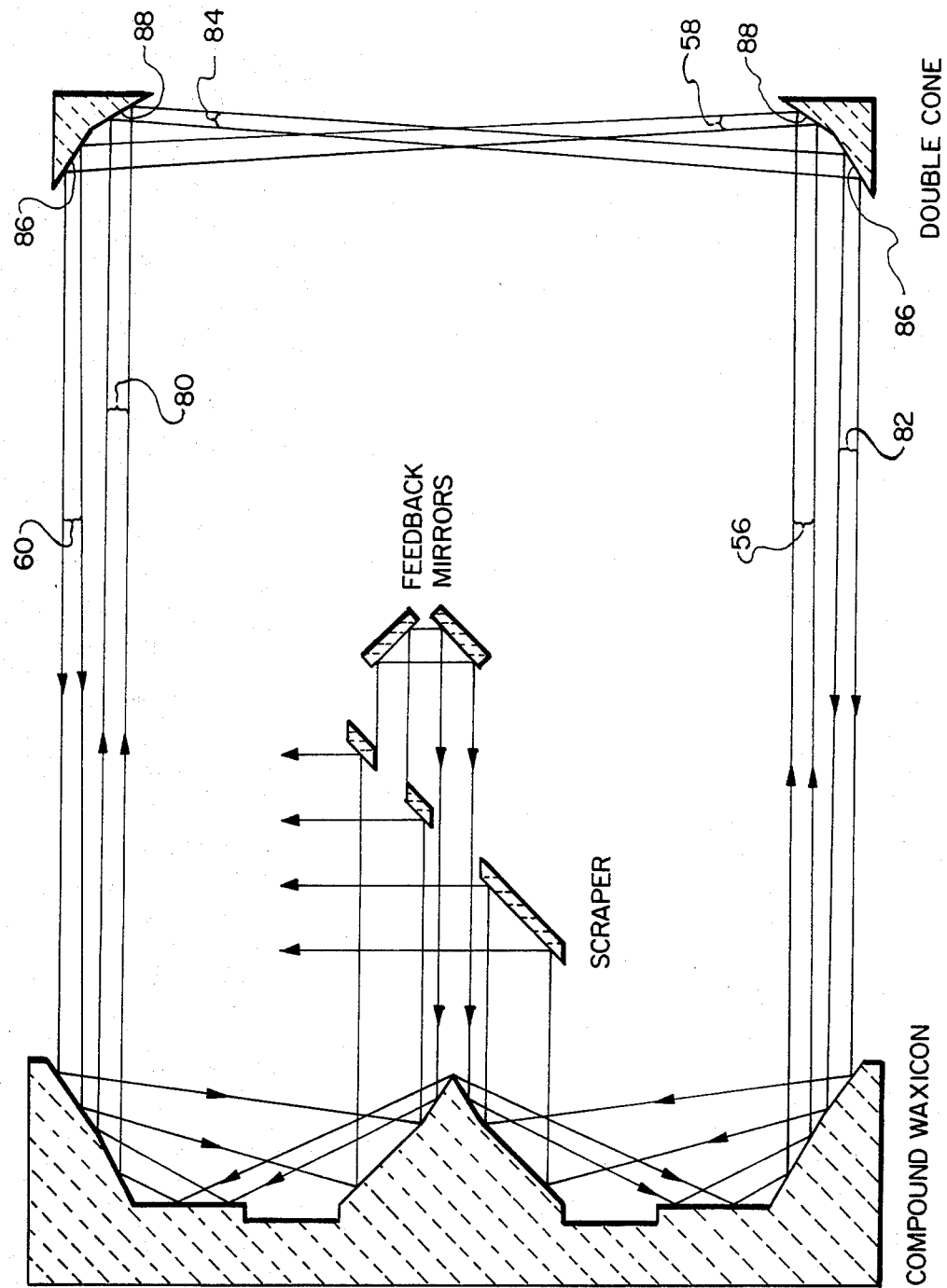

COMMON-PASS DECENTERED ANNULAR RING RESONATOR WITH IMPROVED POLARIZATION CONTROL

BACKGROUND OF THE INVENTION

1. Field of the Invention

This invention relates to optical resonators for lasers and especially to an improved, common-pass decentered annular ring resonator (CPDARR) for a laser.

2. Description of the Prior Art

The CPDARR, which is described in detail later herein, is an outstanding annular ring resonator. It possesses good: (1) transverse mode discrimination; (2) fundamental mode stability; (3) beam quality; and (4) power extraction efficiency. It is relatively insensitive to odd azimuthal periodicity perturbations on the conical mirrors and to waxicon and rear cone misalignments. The only area where a potential problem exists concerns its mechanism for producing a uniformly polarized output beam. It cannot employ conventional high-reflectance coatings on its conical mirror surfaces, but must employ specially designed phase-shift coatings. For example, a special 90-degree phase-shift coating can be applied to the rear conical mirror. With such a coating, the rear cone preserves the polarization state instead of scrambling it and the resonator output beam is uniformly polarized. But phase-shift coatings present a higher risk than conventional coatings. Compared to conventional coatings, the phase-shift coatings generally have: (1) a greater number of dielectric layers; (2) stricter layer-thickness tolerances; (3) higher absorption; and (4) potentially lower damage-threshold intensity levels.

OBJECTS OF THE INVENTION

An object of the invention is to enable a CPDARR to operate with conventional reflectance coatings on its mirror surfaces.

Another object is to minimize the difficulties encountered in the use of a CPDARR, i.e., to reduce the number of dielectric layers used in the reflectance coatings, to reduce strictness required for the layer-thickness tolerances of the reflectance-coating layers, to reduce the absorption undergone by the laser beams in the resonator, and to lower the damage-threshold intensity levels of the CPDARR.

Other objects, advantages and novel features of the present invention will become apparent from the following detailed description of the invention when considered in conjunction with the accompanying drawing.

SUMMARY OF THE INVENTION

The objects and advantages of the present invention are achieved by forming the front waxicon of a CPDARR with five reflecting surfaces. The feedback beam is directed upon the front waxicon and reflected three times before being directed upon the rear conical ring reflector which has an annular mirror which reflects the beam twice. The outgoing beam (i.e., the beam leaving the rear ring reflector) is directed upon the front waxicon where it undergoes two more reflections before being outputted from the CPDARR. The first waxicon triple reflection maintains the uniform-polarity condition of the feedback beam, the two reflections in the rear ring mirror scramble the polarization and the last two reflections in the waxicon restore the uniform-polarity condition of the beam. Thus, conventional high-reflectance coatings can be used on all mirror surfaces.

BRIEF DESCRIPTION OF THE DRAWINGS

FIG. 9 is a schematic illustration of another embodiment of the present invention in which the input beam is reflected twice by the waxicon and the output beam three times.

FIG. 10 is a schematic illustration of yet another embodiment of the invention in which the beams travelling between the waxicon and the rear ring mirror are kept collimated.

The same elements or parts throughout the figures of the drawings are designated by the same reference characters, while equivalent elements bear a prime designation.

DETAILED DESCRIPTION OF THE INVENTION

Since the present invention is an improvement upon the CDPARR (which itself is an improvement upon the Common-Pass Half-Symmetric Unstable Resonator with Internal Axicons (CPHSURIA), the CDPARR will be described herein.

Figure 1:
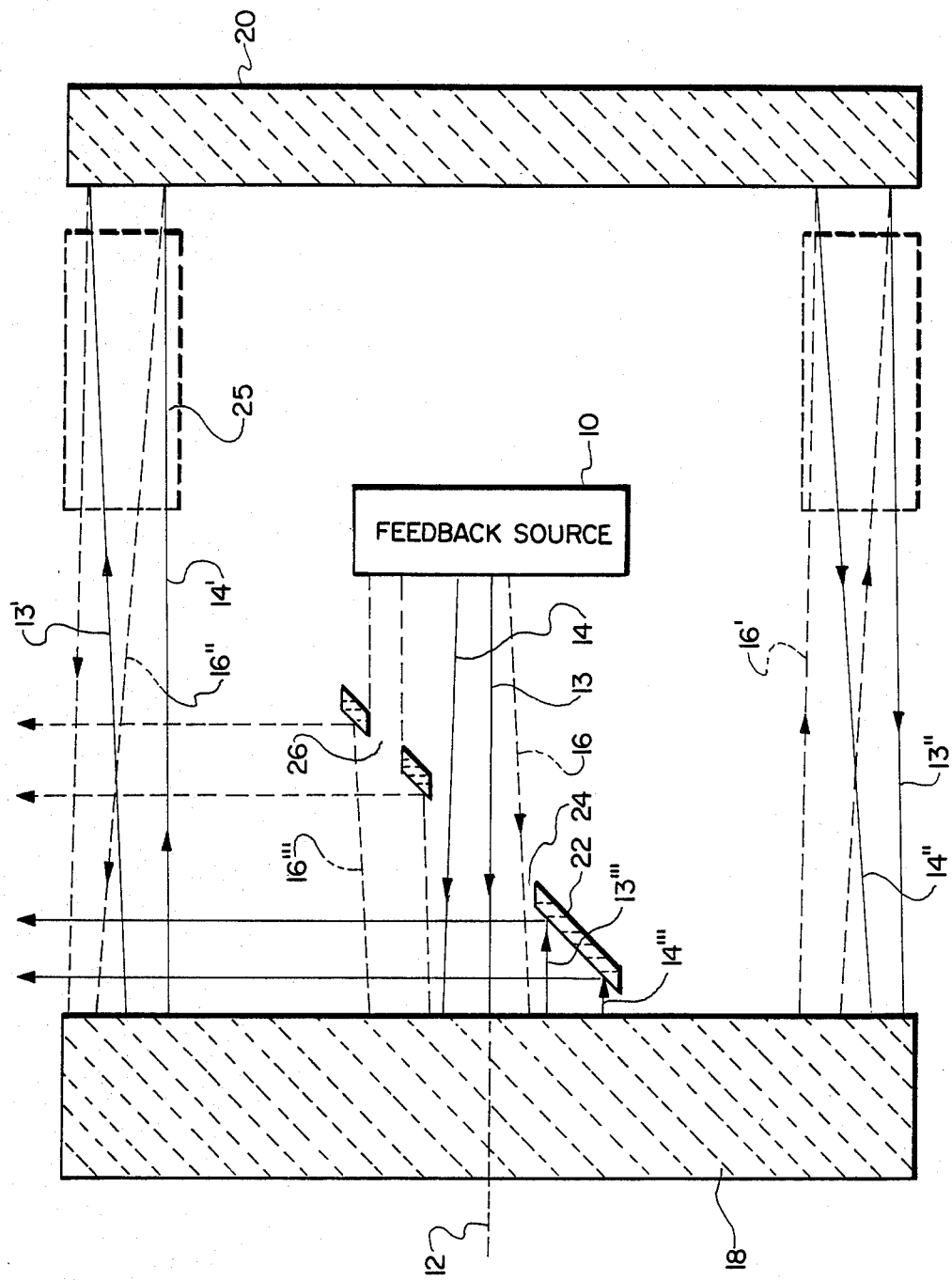
FIG. 1 is a schematic cross-sectional view of a generalized embodiment of a CDPARR.

Referring to FIG. 1, there is shown a generalized or schematic representation of the optical system of the present invention. Consider the numeral 10 in FIG. 1 as representing the source of a compact light beam having an apparent point source lying along the central symmetry axis 12 of the resonator. The compact beam, in the two-dimensional illustration of FIG. 1, includes a central ray 13 aligned along the symmetry axis and an outer ray 14 on the edge of the compact beam. Similarly, a ray 16, shown as a dotted line, represents a ray at the lower margin of the compact beam. While shown in only two dimensions in FIG. 2, it will be understood that the compact beam is a three-dimensional bundle of rays directed along the central axis of the system. This bundle of rays, although illustrated as a diverging beam, may be a collimated beam having an apparent point source at infinity along the central axis.

The compact beam from the feedback source 10 is incident on a mirror system 18 which may take a variety of forms, such as described in detail hereinafter. The mirror system 18 directs the rays of the compact beam radially outwardly from the symmetry axis 12 and then back out in an axial direction toward a second mirror system 20. Thus the incident rays 13 and 14 emerge as rays 13' and 14'. Similarly, the lower ray emerges as ray 16'. Thus as a three-dimensional system, the compact beam emerges as an outer annular beam. This outer annular beam is concentric with the compact beam along the central axis. After passing through an annular gain volume, indicated at 25, of a chemical laser, for example, the rays 13' and 14' in the annular beam are directed radially by the mirror system 20 and emerge at the diametrically opposite position, as indicated at 13" and 14". Thus each ray, in passing between the mirror systems 18 and 20, passes through the annular gain region 25 twice.

On re-entering the mirror system 18, the rays are directed radially inwardly and then emerge off the central axis 12. In the three-dimensional system, these emerging rays are located in an intermediate annular region which surrounds the compact beam, as indicated by the emerging rays 13''', 14''', and 16'''. This emerging annular beam is preferably intercepted by a scraper mirror 22 which may be a flat mirror extending at a nominal angle of 45° to the central axis so as to reflect the rays of the intermediate annular beam out of the resonator in a direction nominally perpendicular to the central axis. The scraper mirror 22 has a central opening 24 through which the compact beam passes in going from the source 10 to the mirror system 18. In addition, the scraper mirror is provided with a small opening 26 which allows some of the rays in the intermediate annular beam to pass through the scraper mirror 22 and impinge on the source 10. The source 10 is a mirror system which acts as a feedback system for redirecting these incident rays back out from the source as the compact beam. The feedback mirror system 10 may consist of any number of flat or curved surface mirrors that may be appropriate for a desired embodiment of this invention.

The mirror systems 18 and 20 are designed to direct the compact beam with its apparent point source located along the central axis 12 into an outer annular beam having rays which pass in both directions through the annular gain region, and are then emitted as an inner annular beam which surrounds the compact beam and in which the apparent point source of the rays is also centered on the optical axis 12. By having the high energy return rays located off the central axis, the problems associated with the prior art system of FIG. 1 are avoided.

Figure 2:
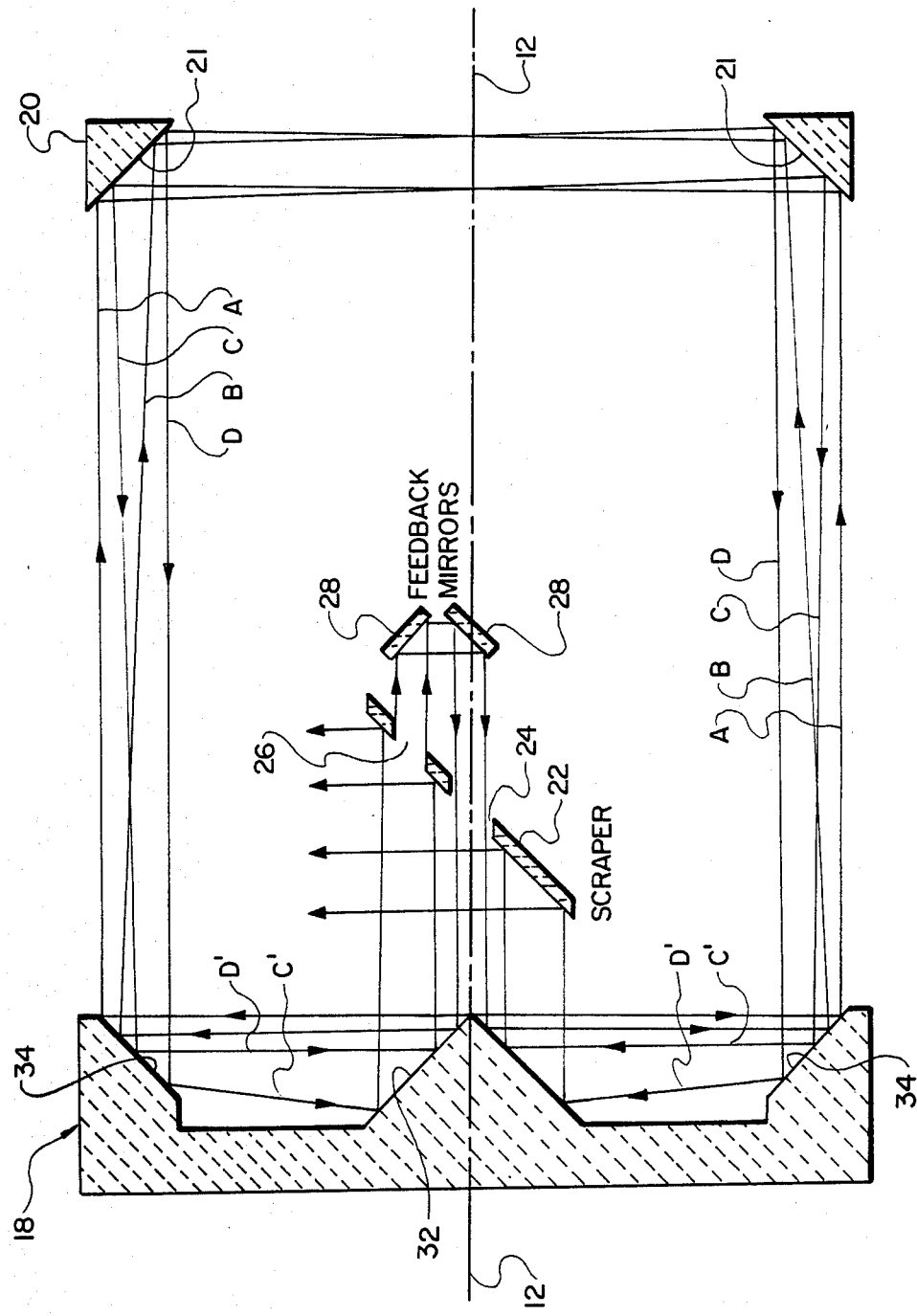
FIG. 2 is a schematic cross-sectional view of a typical embodiment of a CDPARR.

Referring to FIG. 2 in detail, the mirror system 18 is shown as a compound mirror assembly including an inner or central conical mirror 32 and an outer conical mirror 34. Such double conical mirror assembly is sometimes referred to as a W-axicon (or waxicon) because the coaxial conical mirrors form a W-shape in cross section. Both conical mirrors 32 and 35 are concentric, sharing a common axis of revolution 12.

The second mirror system 20 is in the form of a ring having an interior conical mirror 21 concentric with the same common axis 12.

The central conical mirror 32 is formed as two slightly curved conical surfaces with the curve of the outer (larger diameter) surface being slightly different from the conical inner curved (small diameter) surface of the central cone.

The two surfaces form a compound or biaxicon mirror. The transition between the two distinct slightly curved surfaces of the integrated central axicon mirror can be facilitated by a continuous mechanical structure as indicated by Fig. 2. The differences between the two distinct curves of the central axicon surfaces are slight and in most cases hardly discernable from each other or from a single straight line cone in the scale of FIG. 2. In actual practice, it may be possible and/or desirable that one or both of the curved sections actually be a straight line instead of a curve. The curves may be slightly convex or concave, as required, for suitably reflecting the rays of the central compact beam and the surrounding inner annular group of return rays.

Similarly, the mirror 34 is a biconic reflector. The surface of the interior mirror 34 is formed as two adjacent continuous conical surfaces with slightly different curvature.

The mirror surface 21 of the second ring mirror is formed of a single curved conical surface such that rays parallel to the axis 12 striking respectively the outer margin and the inner margin of the surface 21 are reflected at slightly different angles so as to converge slightly toward the diametrically opposite position on the conical surface 21 of the ring mirror 20. The important function of the conical curved surface 21 is to convert the diverging annular ray bundle bounded by rays A and B into a counter-propagating converting annular ray bundle bounded by rays C and D.

The mirror surfaces 32, 34, and 21 all have specially designed reflectance coatings to preserve the polarization of the input (or feedback) beam in the output beam. If the reflectance coatings are of the conventional type, the input-beam polarization will not be preserved but will be scrambled.

The resonator further includes a flat scraper mirror 22 which typically extends at an angle of 45° to the central axis 12. The scraper mirror has two openings, a central opening 24 which is centered on the axis 12 and an off-center opening 26 which is positioned between the central opening 24 and the outer margin of the scraper mirror. Positioned behind the scraper mirror is a sequence of feedback mirrors 28 which transform the rays passing through the off-center hole 26 so that they enter the central hole 24 in the scraper mirror. The feedback mirror system 28 is one means of implementing the source mirror system 10 of FIG. 2. The W-axicon mirror assembly 18, the ring mirror 20, scraper mirror 22 and feedback mirrors 28 are supported in a suitable rigid mounting framework (not shown). The mirror assembly 18 is preferably mounted in rigid framework before the mirror surfaces 32 and 34 are machined so that accurate alignment can be maintained between the various W-axicon mirror surfaces.

The resonator of FIG. 2 thus operates to meet the optical requirements of directing a compact beam on the central axis through an annular gain region and then returning the rays in an annular region surrounding the compact beam and centered on the same central axis.

The compact beam rays reflected from the mirror 34 through the gain region are reflected by the mirror surface 21 to diametrically opposite positions on the conical mirror 20. Because of the slight curvature of the conical surface 21, the slightly diverging incident rays are reflected along less divergent or slightly convergent paths in passing from the diametrically opposite rays C and D, when reflected off the surface of the conical mirror 34, become diverging rays C' and D' which are then reflected off the inner mirror 32 and directed at the scraper mirror 22. Except for the return rays which pass through the off-center opening 26 to the feedback mirrors 28, the light from the scraper mirror 22 is directed at 90° in a lateral beam out of the resonator. The bundle of light rays passing through the opening 26 is fed back by the feedback mirrors 28 through the central opening 24 to make another pass around the resonator and through the annular gain region between the front mirror assembly 18 and the rear mirror ring 20. It will be noted that none of the return rays reflected off the central conical mirror 32 pass through the central opening 24 to the feedback mirrors. All of the return rays originating from the incident rays passing through the opening 24 to the conical surface 32, end up within an annular region surrounding the bundle of incident rays passing through the opening 24. If the optical axis of the resonator (as distinguished from the central axis of the conical optical elements) is defined as the optical ray that self-replicates after one round trip through the resonator optical system, it will be seen that this resonator optical axis is a single unique line everywhere in the resonator. This resonator optical axis never becomes a surface as it does in the prior art resonator.

The improved resonator of FIG. 2 retains the advantages of the prior art resonator in that only two conical mirror assemblies are required to introduce and extract the annular beams that pass through the gain region. The compound W-axicon assembly 18, even though the two concial mirror surfaces are each divided into distinct reflecting surfaces at slightly different conical angles, can be formed by diamond-turning techniques after the W-axicon is assembled, thus assuring permanent and accurate alignment of the individual reflecting surfaces. The double-pass propagation through the gain region during each round trip of the resonator yields efficient power extraction.

While retaining the advantages of the prior art resonator (the CPHSURIA), the improved resonator of FIG. 2 has the further advantage that the line optical axis of the improved resonator can be adjusted so that it avoids the region near the tip of the central conical mirror. This avoids the necessity of maintaining a high accuracy in the finishing of the conical tip in the immediate region of the tip or point, which is difficult to do. Stable single mode operation is maintained even in the presence of a relatively large azimuthal figure error on the conical mirrors. Also no annular beam is compacted to the tip of the central conical mirror, thus greatly reducing the intensity loading at the tip.

The CDPARR is a resonator with outstanding performance, but a potential problem exists with respect to producing a uniformly polarized output beam. This result cannot be accomplished by the use of conventional high-reflectance coatings on the mirror surfaces 32,34 and 21, but specially designed reflectance coatings must be employed. These special coatings result in disadvantages that have previously been mentioned herein, disadvantages that can be avoided by utilization of conventional reflectance coatings on the mirror surfaces of the CPDARR. However, the use of conventional coatings in the CPDARR results in a non-uniformly polarized output beam from the resonator, which is undesirable for many laser applications.

Figure 3:
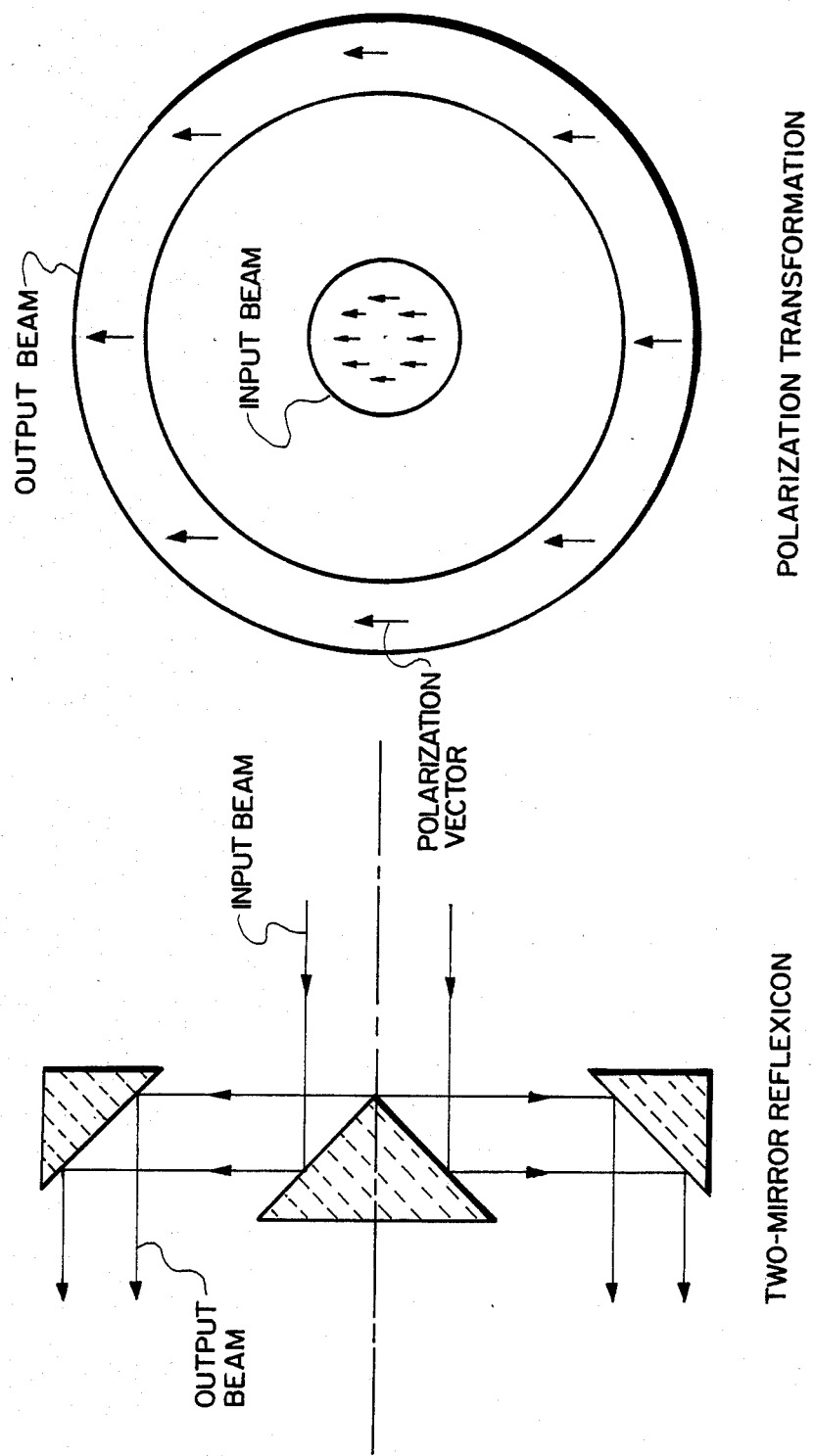
FIG. 3 is a schematic illustration of a two-mirror reflaxicon system and the polarizations of its input and output beams.
Figure 4:
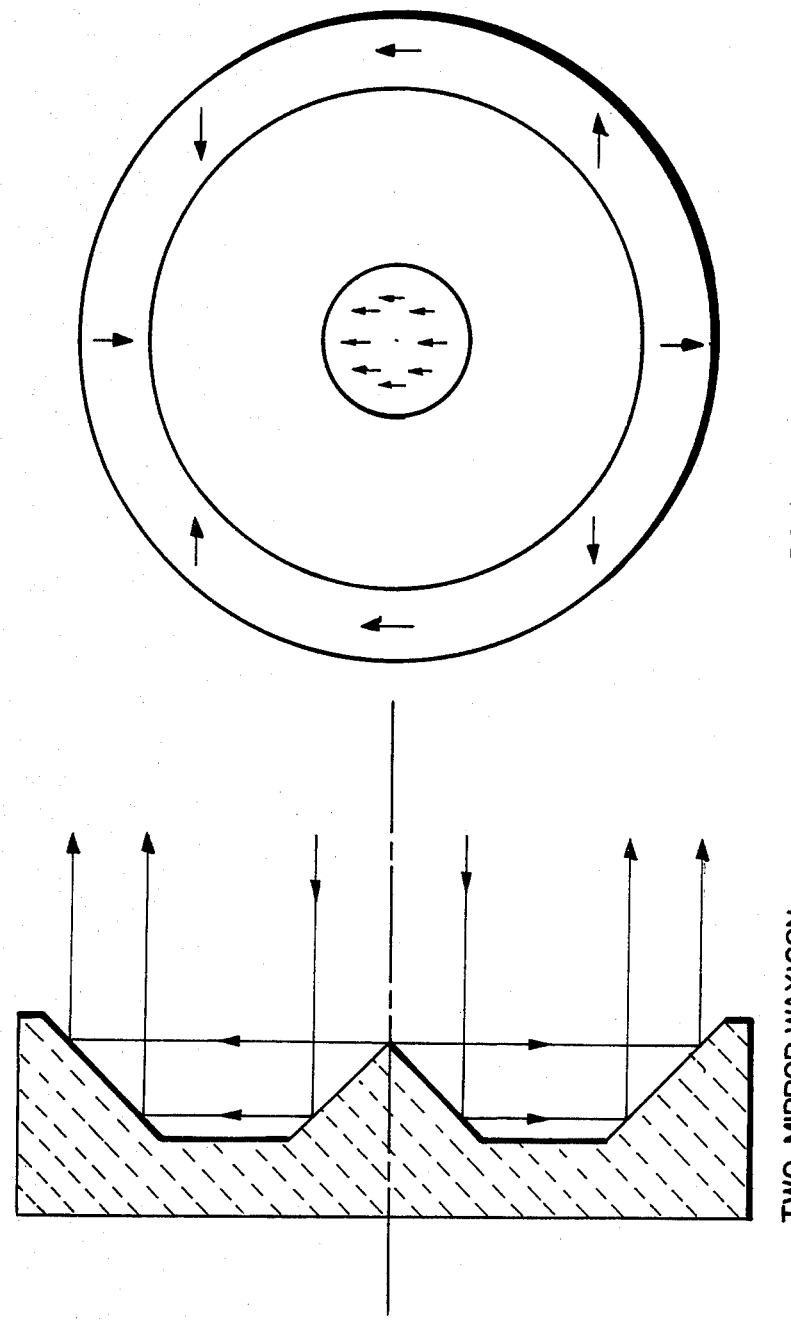
FIG. 4 is a schematic illustration of a two-mirror waxicon and the polarizations of its input and output beams.
Figure 5:
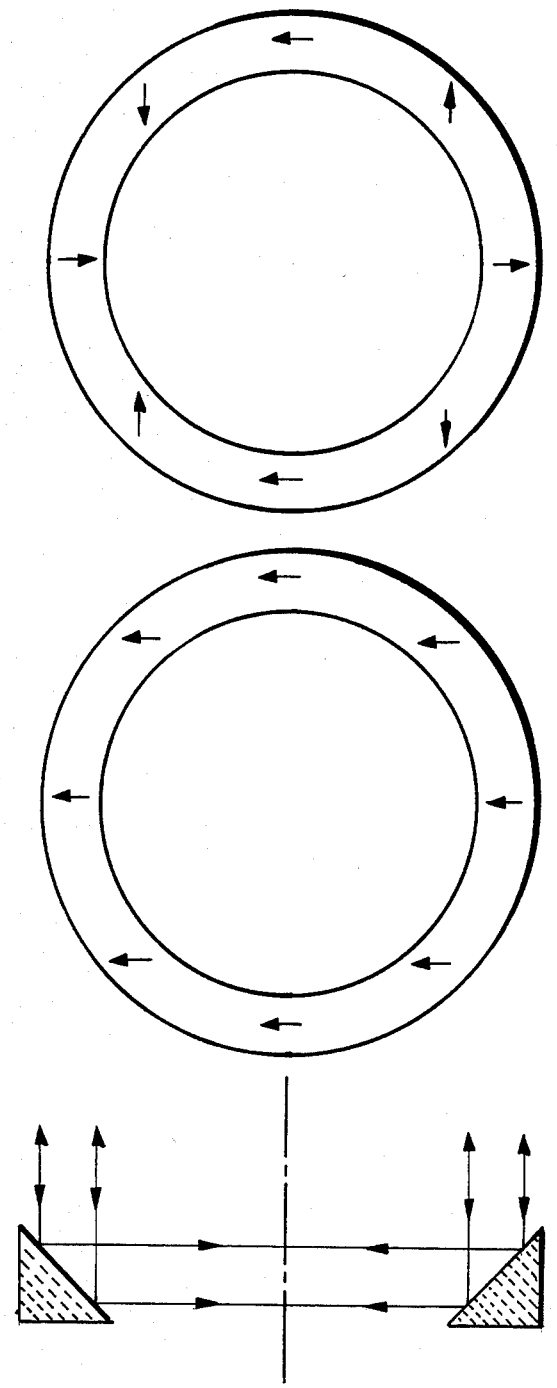
FIG. 5 is a schematic illustration of a conical reflector and of its input and output beam polarizations.

To understand the important subject of polarization control in annular resonators, it is necessary to understand first the polarization-transforming properties of the common optical elements used in annular resonators. To simplify this discussion, it will be assumed that all mirror surfaces are coated with high-reflectance metallic coatings and/or conventional dielectric multilayer stacks. Conventional multilayer stacks consist of alternating layers of high and low refractive index dielectric materials with each layer having an optical thickness of one-quarter wave ($\lambda/4$) at the appropriate angle of incidence. Consider first the reflaxicon system shown in FIG. 3. A uniformly polarized beam of light incident upon the center axicon is transformed by the reflaxicon into an annular beam of light with the same uniform polarization. Consider next the waxicon system shown in FIG. 4. A uniformly polarized beam of light incident upon the center axicon is transformed by the waxicon into an annular beam of light with a "scrambled" polarization state as depicted in the figure. Consider last the conical reflector shown in FIG. 5. A uniformly polarized incident annular beam is reflected with a scrambled polarization state as depicted by the figure. In summary then, reflaxicons preserve polarization states while waxicons and conical reflectors are polarization scramblers. Note that these processes are reversible, e.g., a waxicon can also convert a scrambled polarization state into a uniform polarization state. Thus, if it is desired that conventional coatings be used, careful attention must be paid to the selection of conical elements used in an annular resonator.

In most applications involving annular resonators, it is required that the resonator output beam possess a uniform polarization, i.e., at any instant of time, the direction of the output beam electric field vector must not be a function of position in a plane perpendicular to the direction of propagation. The CPDARR (see FIG. 2) cannot produce a uniformly polarized output beam with conventional coatings on the conical mirror surfaces. This is proved as follows. Assume a uniformly polarized output beam: the feedback beam is thus uniformly polarized, since it consists of the portion of the output beam that went through the decentered scraper hole. Now trace the polarization transformations acquired by the feedback beam as it propagates around the resonator. The waxicon scrambles the polarization, the rear cone unscrambles the polarization and the waxicon then scrambles the polarization, producing an output beam with scrambled polarization which violates the initial assumption.

The novel concept of the present invention achieves a uniformly polarized output beam with a unique combination of conical elements that can be used with conventional, high-reflectance, mirror surface coatings.

Figure 6:
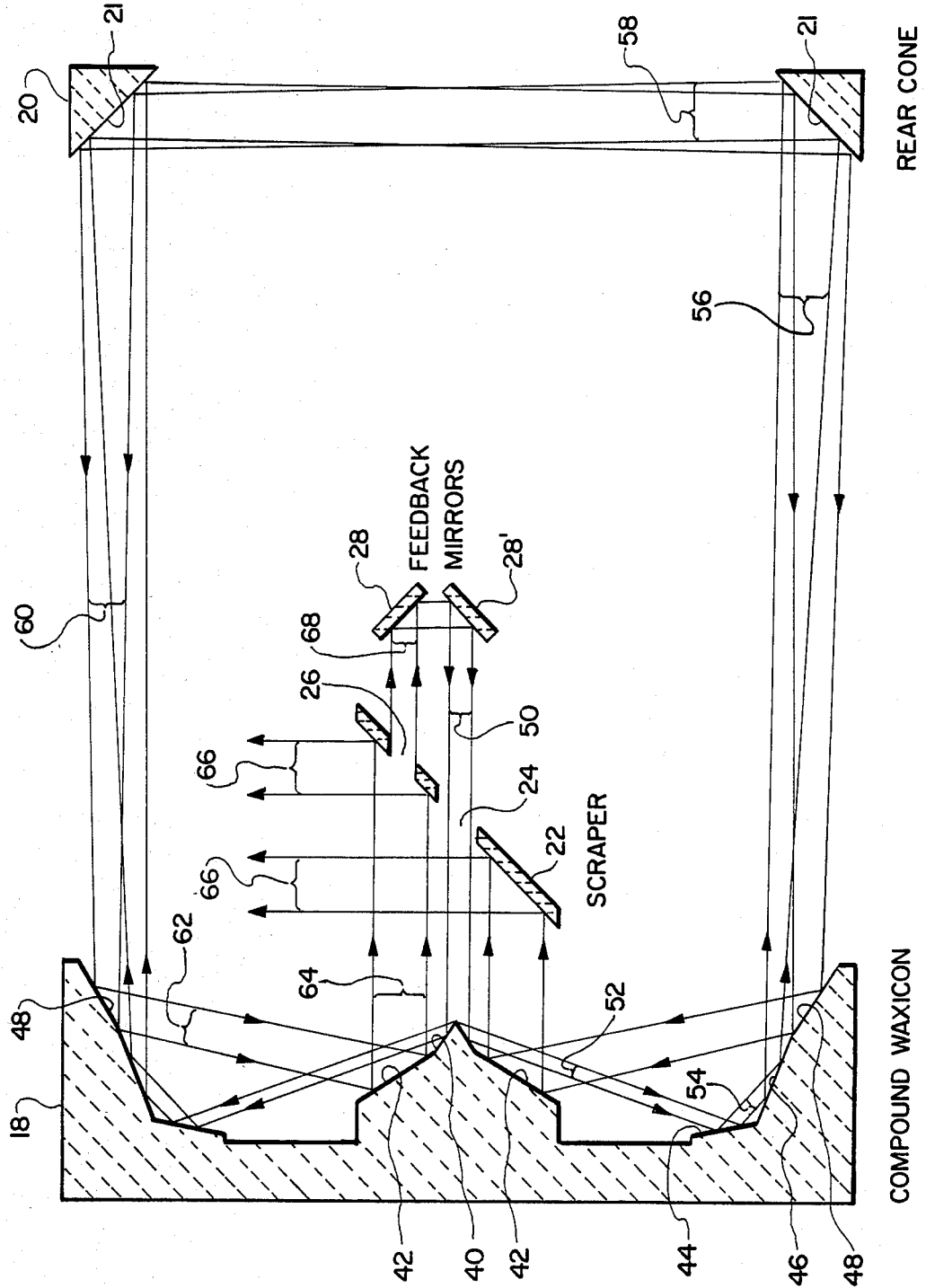
FIG. 6 is a schematic illustration of an embodiment of the present invention.
Figure 7:
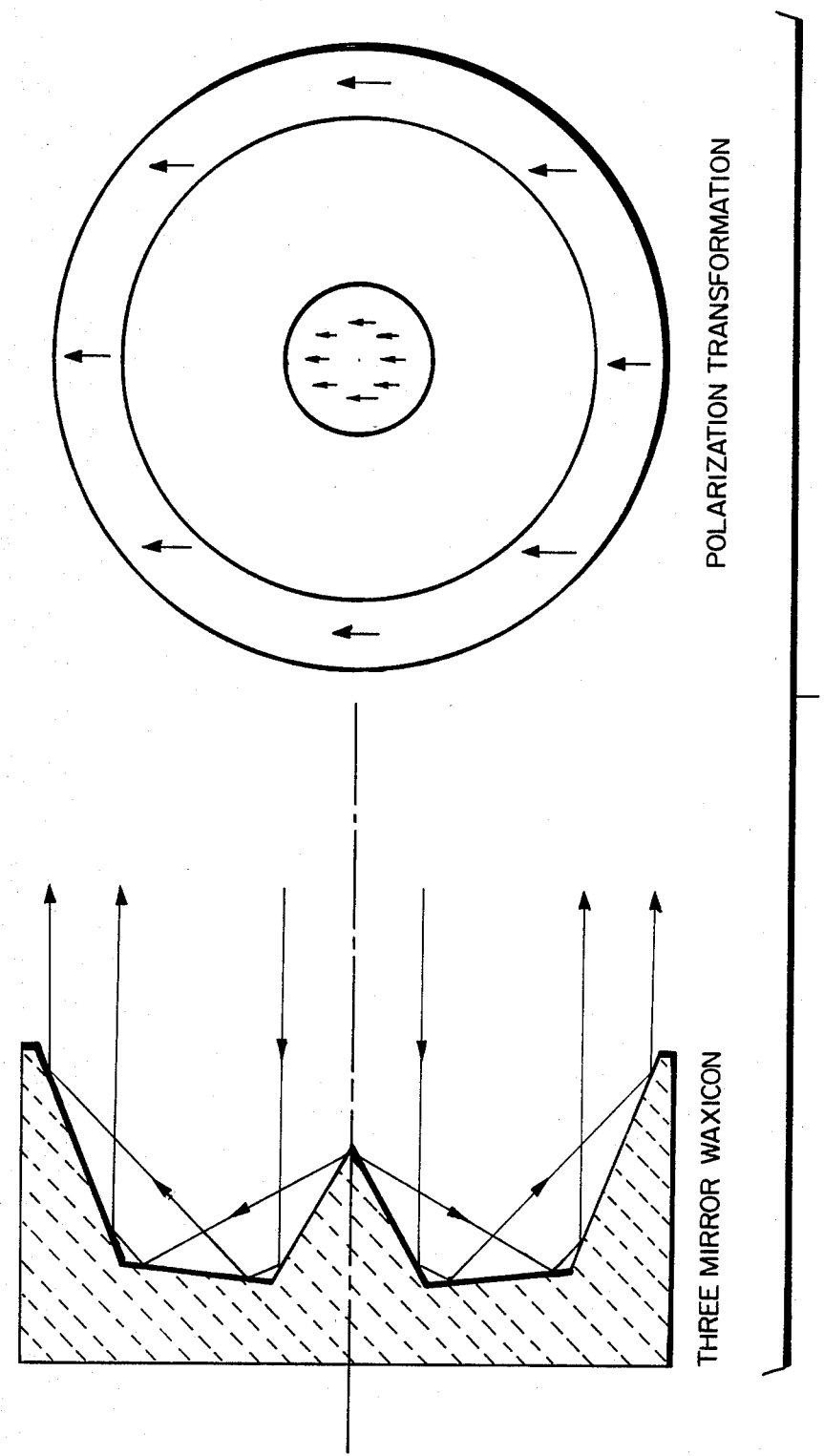
FIG. 7 is a schematic illustration of a three-mirror waxicon and of its input and ouput beam polarizations.

The new resonator concept utilizes a three-surface waxicon, which preserves polarization state (as depicted in FIG. 7) when used with conventional coatings. A typical illustration of the new resonator is shown in FIG. 6. The compound waxicon 18 has *five distinct reflecting surfaces;* a three-mirror waxicon 40,44,46 and a two-mirror waxicon 42, 48 are imbedded in a single unifying structure. The new resonator is called the 3x2CPDARR. Polarization control with conventional coatings is demonstrated by the following argument. Assume a uniformly polarized output beam. As the uniformly polarized feedback beam 50 propagates one round trip through the resonator, the three-mirror waxicon preserves polarization, the rear cone 20 scrambles polarization, and the two-mirror waxicon unscrambles polarization to replicate the previously assumed uniform polarization of the output beam. Except for the type of coatings used, the optical performance and fabricability of the 3x2CPDARR is quite similar to CPDARR.

In operation, a feedback beam 68, which may be roughly a tenth of the power of the output beam 64, is allowed to pass through the feedback aperture 26 in the scraper mirror 22. This beam 68 is reflected by the feedback mirrors 28, 28' and forms the compact input beam 50 which is directed upon the conical mirror surface 40 at the central axicon of the compound waxicon 18. The beam 50 is reflected from mirror surface 40 as beam 52 and impinges upon mirror surface 44. The beam 54 is reflected therefrom to impinge upon mirror surface 46. Thus, there is provided a triple-reflection from a three-mirror system in the waxicon, resulting in a uniformly polarized, diverging beam 56. This beam 56 is reflected twice by the rear ring mirror 20, resulting in a converging, non-uniformly polarized beam 60. The converging beam 60 is directed upon waxicon mirror surface 48 and is reflected therefrom to impinge on the central mirror surface 42 of the waxicon 18. The reflected beam is the compact, uniformly polarized output beam 64 from which the laser output beam 66 is derived. A compact feedback beam 68 is also derived from the output beam 64 by means of the offset aperture 26 in the scraper mirror 22. Thus, the waxicon 18 provides a double-reflection from a two-mirror reflector, which together with the double reflection from the rear ring mirror 20 provides a uniformly polarized output beam.

The beams 50, 52, 54 and 56 will hereinafter be called input beams since they are being fed to the annular gain region of the laser (not shown) and the beams 60, 62, 64 may be called output beams since they come from the annular gain region of the laser.

FIG. 9 illustrates a compound waxicon in which the first reflection of the input beam 50 is from surface 40, the second reflection from the inner-mirror surface 44, and the third reflection from the outer-mirror surface 48 instead of the middle-mirror surface 46, as in the embodiment illustrated in FIG. 6.

Figure 8:
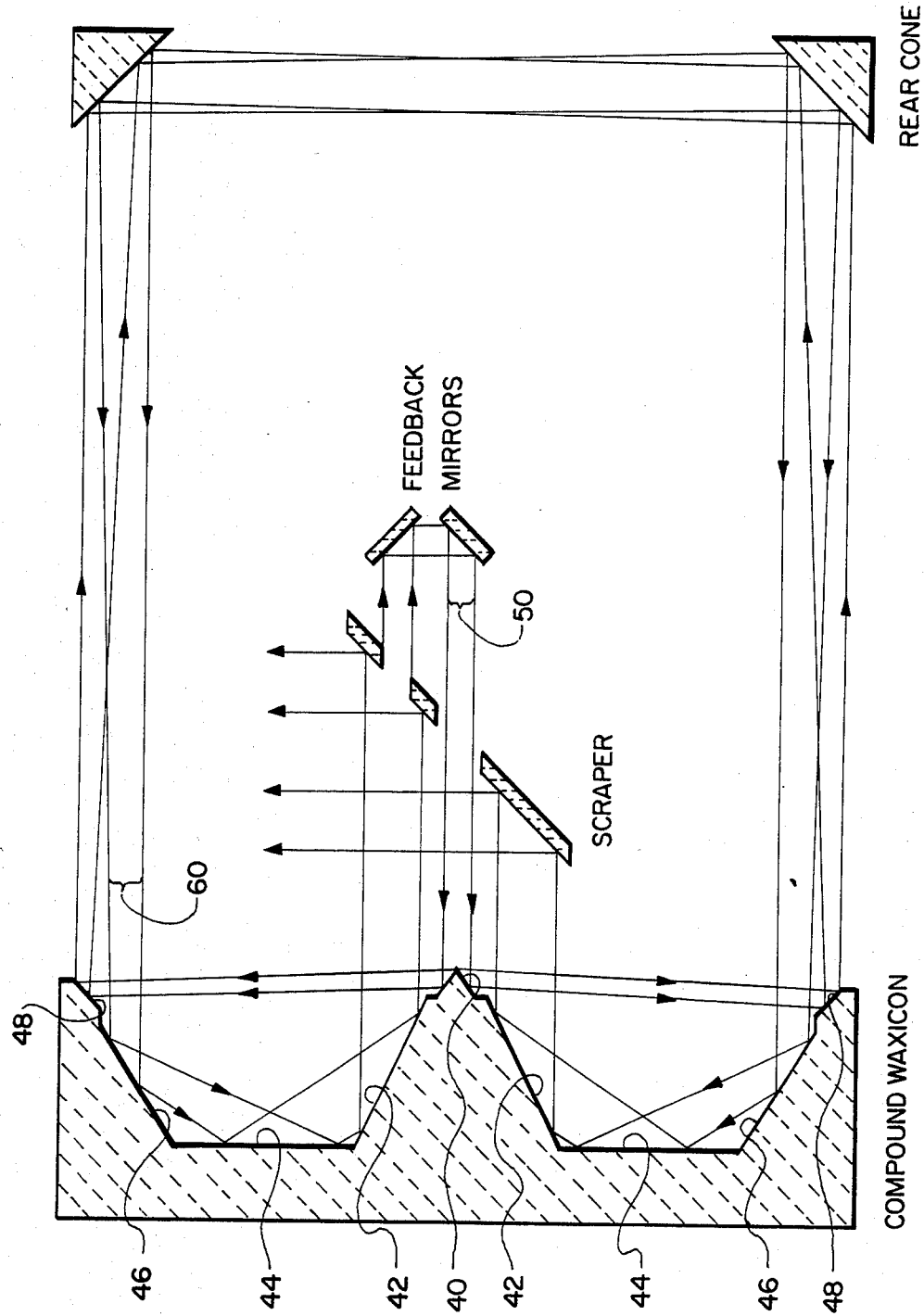
FIG. 8 is a schematic illustration of another embodiment of the present invention, in which the input rays are reflected twice and the output rays three times.

FIG. 8 illustrates a compound waxicon in which the input beam 50 is reflected only twice, from surfaces 40 and 48, whereas the output beam 60 is reflected three times in the waxicon, from surfaces 46, 44 and 42, reversing the reflecting sequence of the embodiments of FIGS. 6 and 7.

Thus, the 3x2CPDARR must have five distinct reflecting surfaces, used in a 3,2 sequence or a 2,3 sequence on the input and ouput beams, and also a rear cone beam rotator 20 to transform the diverging input beam to a converging output beam 60, or at least to a collimated output beam 60. This is because the input and output beams in the waxicon must be physically separated so that each can be handled by a different mirror surface. Each individual mirror surface is specially contoured to handle its impinging beam properly and cannot be contoured to properly handle more than one impinging beam. This individual beam reflection by the various mirror surfaces of the waxicon can be clearly seen in FIGS. 6, 7 and 8.

Various implementation options can be used for the waxicon. Two examples illustrating the potential diversity of the concept are shown in FIGS. 8 and 9. The details of the scraper configuration and the feedback mirror train configuration can be chosen to suit the needs of specific applications. All scraper/feedback train implementation options for generating the output and feedback beams are considered to be within the scope of the 3x2CPDARR concept.

Another embodiment which maintains collimation and separation of the beams outside the waxicon 18 is shown in FIG. 10. This embodiment utilizes a rear ring mirror 20 which has a double reflecting surface comprising outer mirror 86 and inner mirror 88. The reflecting surfaces of the waxicon 18 and the rear ring mirror 20 are designed to maintain, as shown, the collimation of the counter-propagating beams 60, 80, 56 and 82 between the waxicon 18 and the rear ring mirror 20 and of the beams 84 and 58 between reflecting surfaces of the rear ring mirror 20.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a CPDARR in a laser, having a waxicon mirror reflector with mirror surfaces, a rear ring mirror with a reflecting surface facing the waxicon mirror surfaces, a scraper mirror with a central aperture for passing an input feedback beam to the waxicon and an offset aperture for passing an output feedback beam from the waxicon, and feedback mirror means for reversing the direction of the output feedback beam to direct it upon the inner central axicon mirror of the waxicon, the improvement comprising:
    compound waxicon reflecting means having five mirror surfaces, each coated with a conventional high-reflectance coating; and
    rear ring mirror means the mirror surface of which is coated with a conventional high-reflectance coating.

2. The invention defined in claim 1, wherein:
    the central axicon of the waxicon is formed with two mirror surfaces; and
    the ring axicon of the waxicon is formed with three mirror surfaces.

3. The invention defined in claim 1, wherein:
    the input and output beams to and from the waxicon are reflected by the waxicon mirrors three times and two times, respectively.

4. The invention defined in claim 1, wherein:
    the input and output beams to and from the waxicon are reflected by the waxicon two times and three times, respectively.

5. A CPDARR as in claim 2, wherein:
    said waxicon has three mirror surfaces on its ring axicon portion and two mirror surfaces on its central axicon portion.

6. A CPDARR as in claim 5, wherein:
    at least one of said waxicon mirror surfaces is curved.

7. A CPDARR AS IN claim 5, wherein:
    the rear ring mirror is formed with two reflecting surfaces.

8. A CPDARR as in claim 5, wherein:
    the rear ring mirror is formed with two reflecting surfaces, the curvatures of the two reflecting surfaces and of at least one waxicon reflecting surface being appropriate to maintain collimation in the beams traveling between the waxicon and the rear ring mirror.

* * * * *